United States Patent
Sessler et al.

(10) Patent No.: US 8,124,937 B2
(45) Date of Patent: Feb. 28, 2012

(54) SYSTEM AND METHOD FOR ATHERMAL OPERATION OF A FOCAL PLANE ARRAY

(75) Inventors: Todd E. Sessler, Goleta, CA (US);
Matthew T. Kuiken, Goleta, CA (US);
Robert M. Stokes, The Colony, TX (US); William M. Bowser, Plano, TX (US)

(73) Assignee: Raytheon Company, Waltham, MA (US)

( * ) Notice: Subject to any disclaimer, the term of this patent is extended or adjusted under 35 U.S.C. 154(b) by 535 days.

(21) Appl. No.: 12/354,720

(22) Filed: Jan. 15, 2009

(65) Prior Publication Data

US 2010/0176305 A1 Jul. 15, 2010

(51) Int. Cl.
G01J 5/02 (2006.01)

(52) U.S. Cl. .............. 250/339.02; 250/338.1; 250/338.4; 250/339.03

(58) Field of Classification Search ................ 250/338.1, 250/338.4, 339.02, 339.03, 339.14
See application file for complete search history.

(56) References Cited

U.S. PATENT DOCUMENTS

| | | | |
|---|---|---|---|
| 4,752,694 A | 6/1988 | Hegel, Jr. et al. | |
| 4,795,904 A | 1/1989 | Richards | |
| 4,975,864 A | 12/1990 | Sendall et al. | |
| 5,420,421 A | 5/1995 | Lindgren et al. | |
| 5,486,698 A | 1/1996 | Hanson et al. | |
| 5,600,143 A | 2/1997 | Roberts et al. | |
| 5,631,466 A | 5/1997 | Botti et al. | |
| 5,756,999 A | 5/1998 | Parrish et al. | |
| 5,811,808 A | 9/1998 | Cannata et al. | |
| 6,064,066 A | 5/2000 | Bevan et al. | |
| 6,465,785 B1 | 10/2002 | McManus | |
| 6,504,155 B1 | 1/2003 | Ookawa | |
| 6,690,013 B2 | 2/2004 | McManus | |
| 6,707,044 B2 | 3/2004 | Lannestedt et al. | |
| 7,297,924 B2 | 11/2007 | DelTel et al. | |
| 7,348,562 B2 | 3/2008 | Irani | |
| 7,361,899 B2 | 4/2008 | Iida | |
| 2002/0166967 A1* | 11/2002 | Kaufman et al. | 250/332 |
| 2008/0067388 A1* | 3/2008 | Grimberg | 250/338.1 |

FOREIGN PATENT DOCUMENTS

EP 2 012 100 A1 1/2009

OTHER PUBLICATIONS

PCT Notification of Transmittal of the Intl. Search Report and the Written Opinion of the Intl. Searching Authority, or the Declaration mailed Apr. 13, 2010 regarding PCT/US2010/020289 filed Jan. 7, 2010.

* cited by examiner

*Primary Examiner* — David Porta
*Assistant Examiner* — Casey Bryant
(74) *Attorney, Agent, or Firm* — Lando & Anastasi, LLP

(57) ABSTRACT

A method includes determining a signal current based on an average current associated with one or more detectors. The method also includes determining a strip voltage based on the signal current. The method further includes biasing a strip resistance with the strip voltage. The biasing of the strip resistance creates a strip current. The method additionally includes biasing a detector array with a detector voltage. The biasing of the detector array creates a detector current. The method also includes determining levels of incident radiation from a scene based on the strip current and the detector current.

19 Claims, 2 Drawing Sheets

US 8,124,937 B2

SYSTEM AND METHOD FOR ATHERMAL OPERATION OF A FOCAL PLANE ARRAY

TECHNICAL FIELD

This invention relates in general to focal plane arrays and, more particularly, to a system and method for a thermal operation of a focal plane array.

BACKGROUND

Traditional uncooled sensors employ thermal stabilization to achieve usable imagery. Even slight variations in operating temperature (e.g., ambient temperature) may have a more significant impact on the imagery than changes in temperature in a particular scene currently under observation. These sensors often use a thermo electric cooler (TECs) for thermal stabilization. Unfortunately TECs include several drawbacks such as power dissipation, increased size due to the required heat sinks, and operating range limitations due to the thermal limits of the TECs.

SUMMARY

In accordance with particular embodiments a method includes determining a signal current based on an average current associated with one or more detectors. The method also includes determining a strip voltage based on the signal current. The method further includes biasing a strip resistance with the strip voltage. The biasing of the strip resistance creates a strip current. The method additionally includes biasing a detector array with a detector voltage. The biasing of the detector array creates a detector current. The method also includes determining levels of incident radiation from a scene based on the strip current and the detector current.

Technical advantages of particular embodiments include allowing a focal plane array to operate without the need for a TEC. Accordingly the focal plane array may be used in a wider range of operating environments, using less power and comprising less mass. Another technical advantage of particular embodiments may include allowing for the focal plane array to compensate for variances between pixels and between sensors. Accordingly, a more accurate result may be achieved.

Other technical advantages may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of particular embodiments and their advantages, reference is now made to the following description taken in conjunction with the accompanying drawings, in which.

DETAILED DESCRIPTION OF THE DRAWINGS

Figure 1:
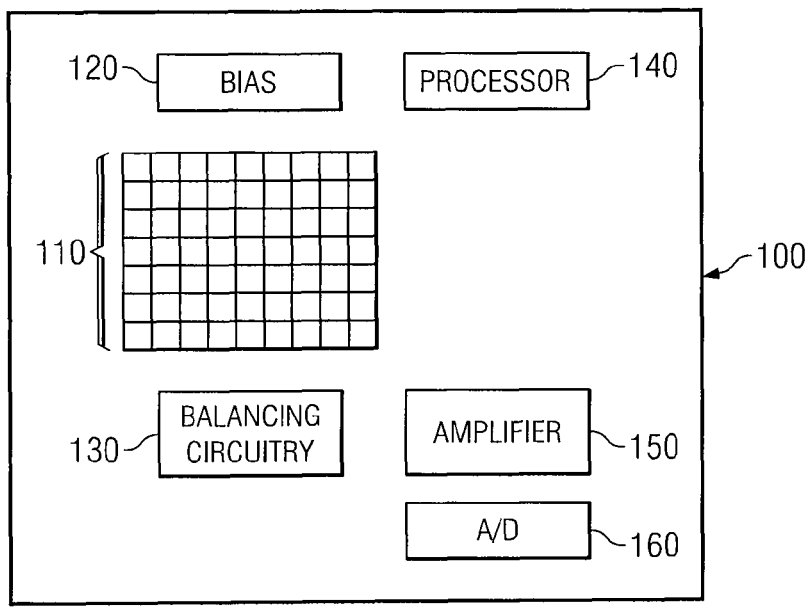
FIG. 1 illustrates a block diagram of a focal plane array, in accordance with particular embodiments.

FIG. 1 illustrates a block diagram of a focal plane array, in accordance with particular embodiments. Focal plane array 100 includes detector array 110, a bias supply 120, balancing circuitry 130, processor 140, amplifier 150, and analog-to-digital converter 160. These components may work together to allow focal plane array 100 to produce a relatively reliable, consistent, and accurate thermal image (e.g., a snapshot or a video) of a scene. This may be true even as ambient or operating temperature changes. Focal plane array 100 may use processor 140 to take into account the ambient temperature, along with certain calibration parameters, when determining voltage and resistance values for components of balancing circuitry 130. Balancing circuitry 130 may, in turn, adjust or compensate the readout from detector array 110 to account for ambient temperature, based on the determinations of processor 140, to allow for a more accurate result. While these components are depicted within a single device, they may be divided among multiple devices. For example, in some embodiments a first device may include detector array 110, balancing circuitry 130, and amplifier 150; a second device may include bias 120, processor 140, amplifier 150, analog-to-digital converter 160.

Detector array 110 comprises an array of detectors arranged in a predetermined pattern. For example, in particular embodiments, detector array 110 may comprise over 327,000 microbolometer detectors arranged in a grid comprised of 512 rows and 640 columns. The actual number of detectors and their arrangement may vary depending on the embodiment, operational requirements, and/or scenario. Each individual detector of detector array 110 may comprise a detector unit having a resistance that varies in response to the temperature of the detector. The material used for the individual detectors may be such that even slight changes in its temperature have a relatively large impact on the material's resistance.

The temperature variations in the detectors of detector array 110 may arise from changes in the ambient temperature (e.g., the change in room temperature) as well as from changes in temperature of a particular scene (e.g., infrared radiation from the scene may heat one or more detectors of detector array 110). In most scenarios the change in resistance due to ambient temperature is greater than the change in resistance due to incident radiation (if the detector is not temperature stabilized, for example with a TEC).

Bias 120 may comprise a voltage source that may generate a bias that may be applied to each of the individual detectors of detector array 110. The bias generated by bias 120 may be constant or it may vary depending on ambient temperature. For example, bias 120 may provide a first bias for temperatures below a first temperature and a second bias for temperatures above the first temperature. Regardless of the magnitude of the bias applied, each detector of the detector array may receive the same bias. In other words, in particular embodiments, bias 120 may be a global bias for the entire detector array.

Balancing circuitry 130 may include individual components that may be adjusted for each individual detector of detector array 110 to account for variations between detectors. The variations between individual detectors may arise during the manufacturing process and/or may be inherent in the material used to manufacture the detectors. These variations may cause individual detectors to respond differently to the same ambient temperature and/or incident radiation. The affect of these variations may be reduced by balancing circuitry 130. Balancing circuitry 130 may also include a variable voltage source that may be adjusted to account for the current ambient temperature.

The values used to adjust the two variable components of balancing circuitry 130 may be calculated by processor 140.

For example, in particular embodiments processor 140 (e.g., a microprocessor, filed programmable array, or any other hardware or encoded logic operable to provide focal plane array functionality) may calibrate itself with the various microbolometer detectors to derive a value for the component of balancing circuitry 130 that is adjusted based on the individual parameters of the detectors of detector array 110 (e.g., to correct for variations between detectors). Processor 140 may also be used to determine the ambient temperature and how to set the variable voltage. The ambient temperature may be determined using readings from one or more of the detectors from detector array 110. For example, one or more of the detectors of detector array 110 may be a shielded detector (e.g., a microbolometer detector that is shielded from incident radiation). Processor 140 may be able to use the calibration information along with the ambient temperature information to determine how to compensate or adjust the output from a particular detector of detector array 110. Furthermore, in particular embodiments, processor 140 may be used to clean-up the resulting signal to be displayed. More specifically, by comparing consecutive voltage values (used to set the variable voltage) for each detector processor 140 may be able to estimate any error associated with that detector. This may, in effect, reduce the amount of grain or noise that is perceived in a displayed image.

Amplifier 150 may comprise one or more amplifiers used to increase the voltage from detector array 110 to a satisfactory voltage for use by analog-to-digital converter 160. Analog-to-digital converter 160 may be any traditional analog-to-digital converter operable to provide a digital output from the analog input received from amplifier 150. The digital output from the analog-to-digital converter may be used by processor 140 to determine the different levels of incident radiation from a particular scene. Processor 140 may further manipulate this information to clean-up the digital signal and use it to generate a video signal of the scene showing, for example, the infrared emissions from the scene.

Figure 2:
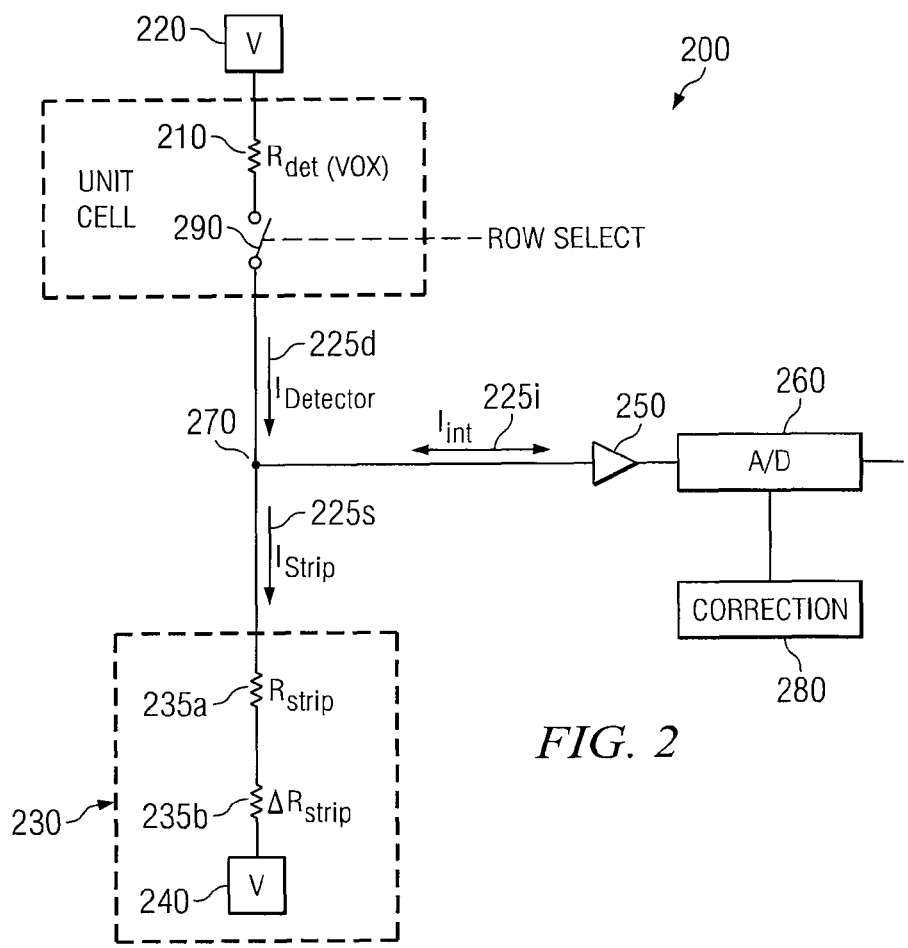
FIG. 2 illustrates a schematic diagram of the signal path for a single detector of a detector array, in accordance with particular embodiments.

FIG. 2 illustrates a schematic diagram of the signal path for a single detector of a detector array, in accordance with particular embodiments. Circuit 200, depicted in FIG. 2, illustrates various components and current flow associated with a single detector 210 of an array of detectors (e.g., detector array 110 depicted in FIG. 1).

Detector 210 may be formed from a material that has an inherent resistance that may be particularly responsive to changes in temperature. As discussed above these changes in temperature may arise from changes in the ambient temperature as well as the level of incident radiation. The individual detectors of an array, such as detector 210, may be selected via row select switch 290. While only one detector is shown, in practice row selected switch 290 may select several detectors within a particular row of a detector array. Accordingly, a multiplexer may be used with the various individual detectors 210 of the selected row. While the depicted embodiment includes a row select switch, some embodiments may process several rows at approximately the same time. In such an embodiment, there may not be a need for a row select switch (although additional components, such as balancing circuitry 230 may be required).

The bias applied to detector 210 may be generated by voltage source 220. Depending on the embodiment, voltage source 220 may provide a constant, predetermined bias, or a variable bias based on ambient temperature. The frequency and degree to which the variable bias may change may be implementation specific. For example, it may vary between individual sessions (e.g., each time the device is turned on), on a periodic or continuous basis, or in response to the ambient temperature crossing a particular threshold. As another example, voltage source 220 may select from among two different predetermined biases (e.g., a first bias when the ambient temperatures is below room temperature and a second bias for temperatures above room temperature), several different predetermined biases, or it may use an algorithm to determine a bias. Regardless of the frequency or degree with which the bias may vary, the bias value that is actually selected and used may be based on the ambient temperature. Furthermore, in particular embodiments, the same bias may be applied globally to each of the detectors of the detector array.

Balancing circuitry 230 includes voltage source 240 and two resistors, Rstrip 235a and dRstrip 235b, which may be referred to collectively as strip resistance. The resistance of Rstrip 235a may be a predetermined resistance while the resistance of dRstrip 235b may be based on the resistance of detector 210. More specifically, dRstrip 235b may be configured to account for the variations between the various detectors of the detector array. Voltage source 240 may provide a varying voltage based on the ambient temperature of the detector (or, more specifically, based on current 225i). In particular embodiments, voltage source 240 may vary with much greater frequency than voltage source 220. More specifically, voltage source 240 may be adjusted each time a reading is taken from the detector array. As discussed above with respect to FIG. 1, the ambient temperature may be determined from one or more shielded detectors of the array of detectors or by averaging the temperature of several of the detectors of the detector array. Thus, between dRstrip 235b and voltage source 240, balancing circuitry 230 may compensate for differences between different detectors and for changes in ambient temperature. More specifically, voltage source 240 may be set so as to keep the average current 225i for all the detectors of the detector array at a constant value (e.g., 0 amps).

Amplifier 250 and analog-to-digital converter 260 may be similar to amplifier 150 and analog-to-digital converter 160 discussed above with respect to FIG. 1.

Correction 280 may comprise any hardware, encoded logic, or software recorded on a computer readable medium that when executed is operable to clean-up the digital signal generated by analog-to-digital converter 260. The clean-up may result in a video signal having less background noise in the image. In particular embodiments, correction 280 may apply a correction to the output from each individual detector 210. For example, in particular embodiments, correction 280 may determine the difference between two values (e.g., two consecutive values) for voltage source 240 at two different times.

The bias applied to detector 210 from voltage source 220, along with the temperature sensitive resistance of detector 210, may result in a certain amount of current 225d being generated. Similarly, the bias applied by voltage source 240, based on the ambient temperature, along with the total strip resistance of Rstrip 235a and dRstrip 235b, may result in a certain amount of current 225s being generated.

There are three different currents, currents 225d, 225s, and 225i, that all enter or leave node 270. These three currents are balanced. In other words, the amount of current entering node 270 is equal to the amount of current leaving node 270. More specifically, in the depicted embodiment current 225d, based on the bias from voltage source 220 and the resistance of detector 210 (as affected by ambient temperature, incident radiation, and its inherent resistance), enters node 270. Then, because current 225s takes into account the ambient temperature and the inherent variability between detectors, when it combines with current 225*d* the current leaving node 270 (current 225*i*) may primarily be based on the incident radiation absorbed by detector 210.

Depending on the scenario, current 225*i* may be a positive or negative current. In other words, depending on the difference between currents 225*s* and 225*d*, current 225*i* may either be entering or leaving node 270. The value of current 225*i* may be amplified by amplifier 250 before being converted into a digital signal by analog-to-digital converter 260. In particular embodiments, analog-to-digital converter 260 may generate a 16-bit digital signal. The digital output from analog-to-digital converter 260 may be used by a processor for subsequent determinations of the bias to be supplied by voltage source 240. It may also be used in determining the levels of incident radiation of a scene and generating a corresponding video or snapshot image of the scene. In particular embodiments, a buffered 16-bit digital-to-analog converter may operate between the processor and voltage source 240.

Figure 3:
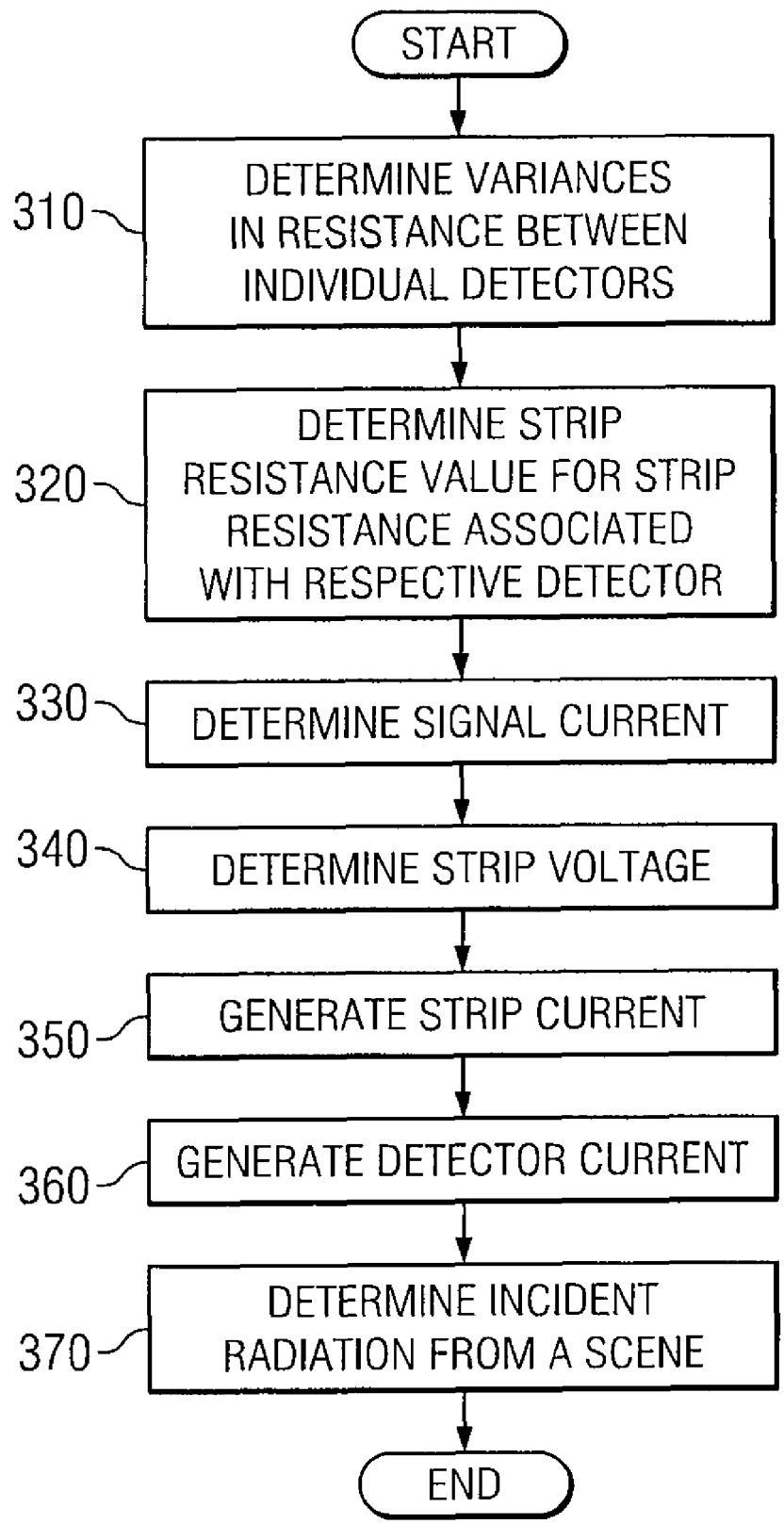
FIG. 3 illustrates a method for a thermal operation of a focal plane array, in accordance with particular embodiments.

FIG. 3 illustrates a method for a thermal operation of a focal plane array, in accordance with particular embodiments. The method begins at step 310 where variances in resistance between individual detectors are determined. These variances may be inherent to the detectors as a natural result of the manufacturing process. In other words, not every single detector in a detector array will have the exact same resistance or experience the same change in resistance from the same change in temperature. Accordingly, a calibration process may be performed in which these variances in resistance between different detectors may be determined. The calibration process may comprise determining the variances in resistance of the detectors for temperature sub-sets of the desired operating temperature.

At step 320 a strip resistance value for the strip resistance associated with a respective detector is determined. This resistance may help to compensate for the variance in resistance of the detector to which the strip resistance is connected. Besides the strip resistance value determined at step 320, the strip resistance may also comprise a second resistance that may be common to all the detectors. The embodiment depicted in FIG. 2 illustrates two separate resistances (Rstrip 235*a* and dRstrip 235*b*) associated with a particular detector. In particular embodiments, the strip resistance may be determined for temperature sub-sets of the desired operating temperature. For example, in particular embodiments, steps 310 and 320 may make their determinations in ten-degree sub-sets. In other words, the strip resistance for an ambient temperature of 20-30 degrees may be determined and then the strip resistance for an ambient temperature of 30-40 degrees may be determined.

At step 330 the ambient temperature is determined. The ambient temperature may represent the temperature of the detector array. There may be a variety of different techniques that may be used to determine the ambient temperature. For example, in some embodiments the ambient temperature may be determined (e.g., by processor 140 depicted in FIG. 1) from one or more shielded detectors. More specifically, by shielding a detector from incident radiation the majority of the heat within the detector may be attributed to the ambient temperature. Thus, changes in the resistance of a shielded detector may be indicative of changes in the ambient temperature. As another example, in some embodiments the ambient temperature may be determined based on the average resistance of all, or a subset of several, of the detectors in the detector array. The ambient temperature may be used to select which strip resistance to use based on the relevant temperature sub-set.

At step 340 the strip voltage is determined based on a signal current. The signal current may be an average of one or more of the resulting currents (e.g., current 225*i*) from removing the strip current (e.g., current 225*s*) from the detector current (e.g., current 225*d*) The strip voltage (e.g., the voltage applied to the strip resistance) may vary as the ambient temperature varies. In particular embodiments, the strip voltage may be determined on a periodic basis. For example, assume that the detector array is used to generate a video image of a particular scene at a rate of 30 frames per second (e.g., the detector array measures incident radiation thirty separate times in a single second). Then, the ambient temperature may be determined thirty times per second which may lead to thirty different determinations of the value to which the strip voltage should be set. As may be apparent step 340 may be repeated and updated with a much greater frequency than steps 310-330.

At step 350 the strip current is generated. The strip current may simply be the current generated by applying the strip voltage to the strip resistance. Thus, as the strip voltage changes, the strip current changes. Similarly, at step 360 the detector current is generated. The detector current may simply be the current generated by applying a detector voltage to the detector array. Thus, as the temperature of a particular detector changes, the associated detector current changes. By adjusting the strip voltage based on changes in the signal current (or the ambient temperature) the resulting strip current, when combined with the detector current from the detector array, may help to cancel or minimize the impact of ambient temperature on the current to, and thus the output from, the analog-to-digital converter.

At step 370 the incident radiation of a scene is determined. The determination may be based on the strip current and the detector current. More specifically, as can be seen in FIG. 2, the strip current and the detector current may combine at a particular point (node 270). The resulting current, representing the difference between the two currents, may then be amplified by an amplifier (e.g., amplifier 250 of FIG. 2) and converted into a digital signal by an analog-to-digital converter (e.g., analog-to-digital converter 260 of FIG. 2). This digital signal may be cleaned-up by a correction device to remove some of the background noise. The resulting signal may be indicative of the incident radiation detected by the detector array. In certain embodiments, the incident radiation may be determined at pre-determined frequency (e.g., 30 Hz).

Some of the steps illustrated in FIG. 3 may be combined, modified, deleted, or rearranged where appropriate, and additional steps may also be added to the flowchart. For example, in some embodiments, the number of detectors within the detector array may make it desirable to determine the incident radiation by dividing the detector array into a plurality of subsets. For example, it may be desirable to detect the resistance of the detectors within a single row. Accordingly, the method may include sequentially selecting from the detector array one row at a time and determining the incident radiation of just the detectors within the selected row.

Although particular embodiments have been described in detail, it should be understood that various other changes, substitutions, combinations and alterations may be made hereto without departing from the spirit and scope of particular embodiments. For example, although an embodiment has been described with reference to a number of elements included within focal plane array 100 these elements may be combined, rearranged or positioned in order to accommodate particular routing architectures or needs. In addition, any of these elements may be provided as separate external components to focal plane array 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for operation of a focal plane array, comprising:
   determining a signal current based on an average current associated with one or more detectors;
   determining a strip voltage based on the signal current;
   biasing a strip resistance with the strip voltage, the biasing of the strip resistance creating a strip current;
   biasing a detector array with a detector voltage, the biasing of the detector array creating a detector current; and
   determining levels of incident radiation from a scene based on the strip current and the detector current.

2. The method of claim 1, wherein determining levels of incident radiation comprises determining levels of incident radiation on a periodic basis having a first frequency.

3. The method of claim 1, wherein determining the strip voltage comprises determining the strip voltage on a periodic basis having a first frequency.

4. The method of claim 1, further comprising:
   determining variances in resistance between individual detectors of the detector array; and
   determining a strip resistance value for the strip resistance associated with a respective detector based on the variance of the respective detector.

5. The method of claim 1, further comprising determining ambient temperature via a resistance of a plurality of detectors shielded from incident radiation.

6. The method of claim 1, further comprising determining ambient temperature via an average resistance of a first number of detectors of the detector array.

7. The method of claim 1, wherein determining levels of incident radiation associated with a scene comprises:
   combining the strip current and the detector current; and
   determining levels of incident radiation based on the combined strip current and detector current.

8. The method of claim 7, further comprising amplifying the combined strip current and detector current.

9. The method of claim 7, further comprising converting the combined strip current and detector current into a digital signal.

10. The method of claim 1, wherein determining levels of incident radiation comprises sequentially selecting one detector subset of a plurality of detector subsets and determining levels of incident radiation of the subset of detectors, the detector subset comprising a subset of detectors from the plurality of detectors.

11. A focal plane array, comprising:
   a detector array comprising a plurality of detectors having a resistance that changes with changes in temperature;
   at least a first voltage source coupled to the detector array and operable to supply a detector voltage to the detector array;
   a plurality of resistors, each detector of the detector array coupled to at least one respective resistor of the plurality of resistors;
   at least a second voltage source coupled to at least one of the resistors, the second voltage source operable to supply a variable strip voltage responsive to a variable bias signal;
   at least one processor coupled to the second voltage source and operable to generate the variable bias signal; and
   at least one analog-to-digital converter coupled to the resistors and the detectors and operable to generate a digital signal from the combination of a current from one of the detectors and a current from one or more respective resistors, the digital signal indicative of a level of incident radiation detected by the detector array.

12. The system of claim 11, wherein the processor determines ambient temperature via a plurality of detectors within the detector array that are shielded from incident radiation.

13. The system of claim 11, wherein the processor determines ambient temperature via an average resistance of a first number of detectors of the detector array.

14. The system of claim 11, further comprising a processor operable to generate a video signal that is viewable on a display device.

15. The system of claim 11, wherein the processor is further operable to generate the variable bias signal on a periodic basis having a first frequency.

16. The system of claim 11, further comprising a processor operable to:
   determine variances in resistance between individual detectors of the detector array; and
   select a resistance value for at least one resistor based on the variance of the respective detector to which the resistor is coupled.

17. The system of claim 11, further comprising an amplifier coupled to the analog-to-digital converter and operable to amplify a current created from the combination of a strip current from one of the resistors of the plurality of resistors and a detector current from one of the detectors of the detector array.

18. The system of claim 11:
   wherein the detectors of the detector array are arranged in a grid comprising a plurality of rows and a plurality of columns; and
   further comprising a switch operable to sequentially select one row of detectors at a time.

19. The system of claim 11, wherein the processor is further operable to compare a value associated with the variable bias signal at two or more different times.

* * * * *